(12) United States Patent
Seimiya et al.

(10) Patent No.: US 11,332,126 B2
(45) Date of Patent: May 17, 2022

(54) PARKING ASSISTANCE APPARATUS

(71) Applicant: HITACHI AUTOMOTIVE SYSTEMS, LTD., Hitachinaka (JP)

(72) Inventors: Masashi Seimiya, Hitachinaka (JP); Satoshi Matsuda, Hitachinaka (JP); Tomoyasu Sakaguchi, Hitachinaka (JP); Yusuke Kogure, Hitachinaka (JP); Yoshitaka Fukasawa, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/978,955

(22) PCT Filed: Feb. 8, 2019

(86) PCT No.: PCT/JP2019/004572
§ 371 (c)(1),
(2) Date: Sep. 8, 2020

(87) PCT Pub. No.: WO2019/181265
PCT Pub. Date: Sep. 26, 2019

(65) Prior Publication Data
US 2020/0406890 A1 Dec. 31, 2020

(30) Foreign Application Priority Data
Mar. 23, 2018 (JP) .............................. JP2018-057050

(51) Int. Cl.
*B60W 30/06* (2006.01)
*B60W 50/035* (2012.01)
(Continued)

(52) U.S. Cl.
CPC .......... *B60W 30/06* (2013.01); *B60W 50/035* (2013.01); *B62D 15/027* (2013.01);
(Continued)

(58) Field of Classification Search
CPC ......... B60W 2420/52; B60W 2420/54; B60W 2554/20; B60W 2554/60; B60W 30/06;
(Continued)

(56) References Cited

U.S. PATENT DOCUMENTS 6,061,015 A * 5/2000 Sugimoto ............. G01S 13/865
342/71
2005/0264099 A1* 12/2005 Kamiya .................... B60T 7/22
303/15

(Continued)

FOREIGN PATENT DOCUMENTS

| DE | 102015220355 A1 | 4/2017 |
| JP | H11-202049 A | 7/1999 |
| JP | 2005-343249 A | 12/2005 |

OTHER PUBLICATIONS

International Search Report with English translation and Written Opinion issued in corresponding application No. PCT/JP2019/004572 dated May 28, 2019.

*Primary Examiner* — Babar Sarwar
(74) *Attorney, Agent, or Firm* — Foley & Lardner LLP

(57) ABSTRACT

When one sensors fails and thus malfunctions during automatic parking of a vehicle, only the other sensor functions. Accordingly, depending on the behavior of the vehicle, the detection characteristics of the other sensor cause degradation in recognition of the vehicle, hindering the automatic parking from being continued. In processing S401, a determination is made whether or not an external recognition device, such as a camera or sonar, malfunctions. In processing S402, based on the determination on malfunction of the external recognition device, a determination is made whether or not to restrict vehicle speed or to restrict a path, with reference to restriction information for parking control. The restriction information for parking control provides information for restricting the vehicle speed in accordance (Continued)

with the malfunction of the camera, and for restricting the path in accordance with the malfunction of the sonar. Next, in processing S403, a determination is made whether or not the automatic parking is in progress. When the automatic parking is in progress, the process proceeds to processing S404 where vehicle speed control or the like is performed for the automatic parking in accordance with the malfunction of the external recognition device.

14 Claims, 16 Drawing Sheets

(51) Int. Cl.
*B62D 15/02* (2006.01)
*G08G 1/16* (2006.01)

(52) U.S. Cl.
CPC ......... *G08G 1/168* (2013.01); *B60W 2420/52* (2013.01); *B60W 2420/54* (2013.01); *B60W 2554/20* (2020.02); *B60W 2554/60* (2020.02)

(58) Field of Classification Search
CPC ............... B60W 50/035; B62D 15/027; B62D 15/0285; G08G 1/168
See application file for complete search history.

(56) References Cited

U.S. PATENT DOCUMENTS

| | | | | |
|---|---|---|---|---|
| 2011/0301814 | A1* | 12/2011 | Wuttke | B62D 15/0285 |
| | | | | 701/41 |
| 2018/0178840 | A1* | 6/2018 | Li | B60W 30/06 |
| 2018/0297609 | A1* | 10/2018 | Bozsik | B60W 50/023 |
| 2020/0387153 | A1* | 12/2020 | Noguchi | G05D 1/0011 |

\* cited by examiner

FIG. 6

| PARKING METHOD | PARKING DIRECTION | | FRONTWARD RECOGNITION GROUP MALFUNCTIONING fFRNG = 1 | REARWARD RECOGNITION GROUP MALFUNCTIONING fRRNG = 1 | LEFTWARD RECOGNITION GROUP MALFUNCTIONING fLRNG = 1 | RIGHTWARD RECOGNITION GROUP MALFUNCTIONING fRRNG = 1 | ANY ONE OF fCAMNG[n] (CAMERA MALFUNCTIONING IS VALID) ? | ANY ONE OF fSONNG[n] (SONAR MALFUNCTIONING IS VALID) ? |
|---|---|---|---|---|---|---|---|---|
| DOUBLE | FORWARD | RIGHT | PROHIBITED | PERMITTED | PERMITTED | PROHIBITED | VEHICLE SPEED RESTRICTED | PATH RESTRICTED |
| | | LEFT | PROHIBITED | PERMITTED | PROHIBITED | PERMITTED | VEHICLE SPEED RESTRICTED | PATH RESTRICTED |
| | REVERSE | RIGHT | PERMITTED | PROHIBITED | PERMITTED | PROHIBITED | VEHICLE SPEED RESTRICTED | PATH RESTRICTED |
| | | LEFT | PERMITTED | PROHIBITED | PROHIBITED | PERMITTED | VEHICLE SPEED RESTRICTED | PATH RESTRICTED |
| PARALLEL | FORWARD | RIGHT | PROHIBITED | PERMITTED | PERMITTED | PROHIBITED | VEHICLE SPEED RESTRICTED | PATH RESTRICTED |
| | | LEFT | PROHIBITED | PERMITTED | PROHIBITED | PERMITTED | VEHICLE SPEED RESTRICTED | PATH RESTRICTED |
| | REVERSE | RIGHT | PERMITTED | PROHIBITED | PERMITTED | PROHIBITED | VEHICLE SPEED RESTRICTED | PATH RESTRICTED |
| | | LEFT | PERMITTED | PROHIBITED | PROHIBITED | PERMITTED | VEHICLE SPEED RESTRICTED | PATH RESTRICTED |
| OBLIQUE | FORWARD | RIGHT | PROHIBITED | PERMITTED | PERMITTED | PROHIBITED | VEHICLE SPEED RESTRICTED | PATH RESTRICTED |
| | | LEFT | PROHIBITED | PERMITTED | PROHIBITED | PERMITTED | VEHICLE SPEED RESTRICTED | PATH RESTRICTED |
| | REVERSE | RIGHT | PERMITTED | PROHIBITED | PERMITTED | PROHIBITED | VEHICLE SPEED RESTRICTED | PATH RESTRICTED |
| | | LEFT | PERMITTED | PROHIBITED | PROHIBITED | PERMITTED | VEHICLE SPEED RESTRICTED | PATH RESTRICTED |

*FIG. 8*

| PARKING METHOD | PARKING DIRECTION | | PARKING PATTERN PTNPA |
|---|---|---|---|
| DOUBLE | FORWARD | RIGHT | PARKING PATTERN 1 |
| | | LEFT | PARKING PATTERN 2 |
| | REVERSE | RIGHT | PARKING PATTERN 3 |
| | | LEFT | PARKING PATTERN 4 |
| PARALLEL | FORWARD | RIGHT | PARKING PATTERN 5 |
| | | LEFT | PARKING PATTERN 6 |
| | REVERSE | RIGHT | PARKING PATTERN 7 |
| | | LEFT | PARKING PATTERN 8 |
| OBLIQUE | FORWARD | RIGHT | PARKING PATTERN 9 |
| | | LEFT | PARKING PATTERN 10 |
| | REVERSE | RIGHT | PARKING PATTERN 11 |
| | | LEFT | PARKING PATTERN 12 |

FIG. 16
(A) 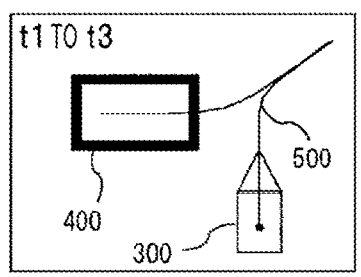
(B) 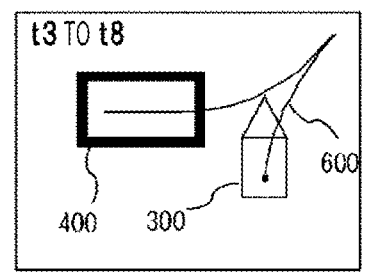

PARKING ASSISTANCE APPARATUS

TECHNICAL FIELD

The present invention relates to a parking assistance apparatus.

BACKGROUND ART

A parking assistance apparatus is configured to automatically park a vehicle at a target parking position that a driver designates. The parking assistance apparatus automatically performs some or all of accelerator, brake, and steering operations to automatically park the vehicle at the target parking position. The parking assistance apparatus includes an external recognition device, such as a camera or a sonar.

PTL 1 discloses a parking assistance apparatus that includes an external recognition device formed in a combination of different kinds of sensors, i.e., a laser radar sensor and a millimeter wave radar sensor, to detect an obstacle. The parking assistance apparatus determines whether or not measurement of the laser radar sensor is degraded. When the measurement of the laser radar sensor is degraded, the parking assistance apparatus detects the obstacle based on the millimeter wave radar sensor.

CITATION LIST

Patent Literature

PTL 1: JP H11-202049 A

SUMMARY OF INVENTION

Technical Problem

Typically, a parking assistance apparatus includes, as an external recognition device, sensors having different kinds of detection characteristics, such as a monocular camera and a sonar. Accordingly, when one of the sensors fails and thus malfunctions during automatic parking of a vehicle, only the other sensor functions. As a result, in some behavior of the vehicle, detection characteristics of the other sensor cause degradation in the external recognition, hindering the automatic parking assistance apparatus from continuing the automatic parking.

Solution to Problem

The present invention provides a parking assistance apparatus including: a plurality of external recognition devices provided in a vehicle; and a control unit configured to control automatic parking based on the plurality of external recognition devices. When one of the plurality of external recognition devices malfunctions, the control unit changes to control the automatic parking in accordance with the other external recognition device.

Advantageous Effects of Invention

According to the present invention, it is possible to continue automatic parking even when one of the external recognition devices malfunctions.

BRIEF DESCRIPTION OF DRAWINGS

FIG. 6 is a table showing restriction information for parking control.

FIG. 8 is a table showing parking patterns.

FIG. 16 illustrates a parking path when the sonar malfunctions.

DESCRIPTION OF EMBODIMENTS

Figure 1:
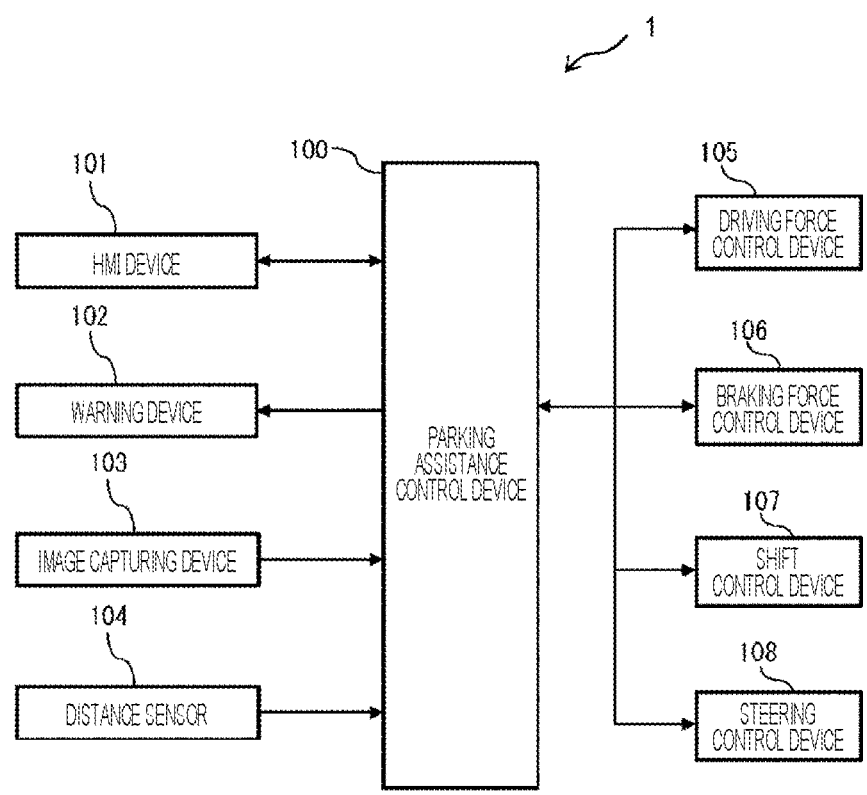
FIG. 1 is a diagram showing a configuration of a parking assistance apparatus.

A configuration of a parking assistance apparatus 1 will be described with reference to FIG. 1.

The parking assistance apparatus 1 includes a parking assistance control device 100, a human machine interface (HMI) device 101, a warning device 102, an image capturing device 103, a distance sensor 104, a driving force control device 105, a braking force control device 106, a shift control device 107, and a steering control device 108. The parking assistance control device 100 outputs information to the HMI device 101, the warning device 102, the driving force control device 105, the braking force control device 106, the shift control device 107, and the steering control device 108. On the other hand, each of the HMI device 101, the image capturing device 103, the distance sensor 104, the driving force control device 105, the braking force control device 106, the shift control device 107, and the steering control device 108 inputs information to the parking assistance control device 100.

The image capturing device 103 is, for example, a camera including an imaging element. The distance sensor 104 is, for example, a sonar, a millimeter wave radar, a laser radar, an infrared sensor, or an ultrasonic sensor. In this embodiment, the image capturing device 103 and the distance sensor 104, each having different detection characteristics from the other, are employed as external recognition devices. The image capturing device 103, in its external recognition using a monocular camera for example, continuously captures a plurality of images in order to detect a position of an obstacle. Then, the image capturing device 103 uses temporal parallax of these images to detect the obstacle. Accordingly, when a vehicle runs on a curved path, the image capturing device 103 exhibits characteristics for recognizing the obstacle more three-dimensionally than when the vehicle runs on a straight path. On the other hand, the distance sensor 104, in its external recognition using the sonar for example, exhibits characteristics for being less accurate when relative speed between the vehicle and the obstacle is increased.

Figure 2:
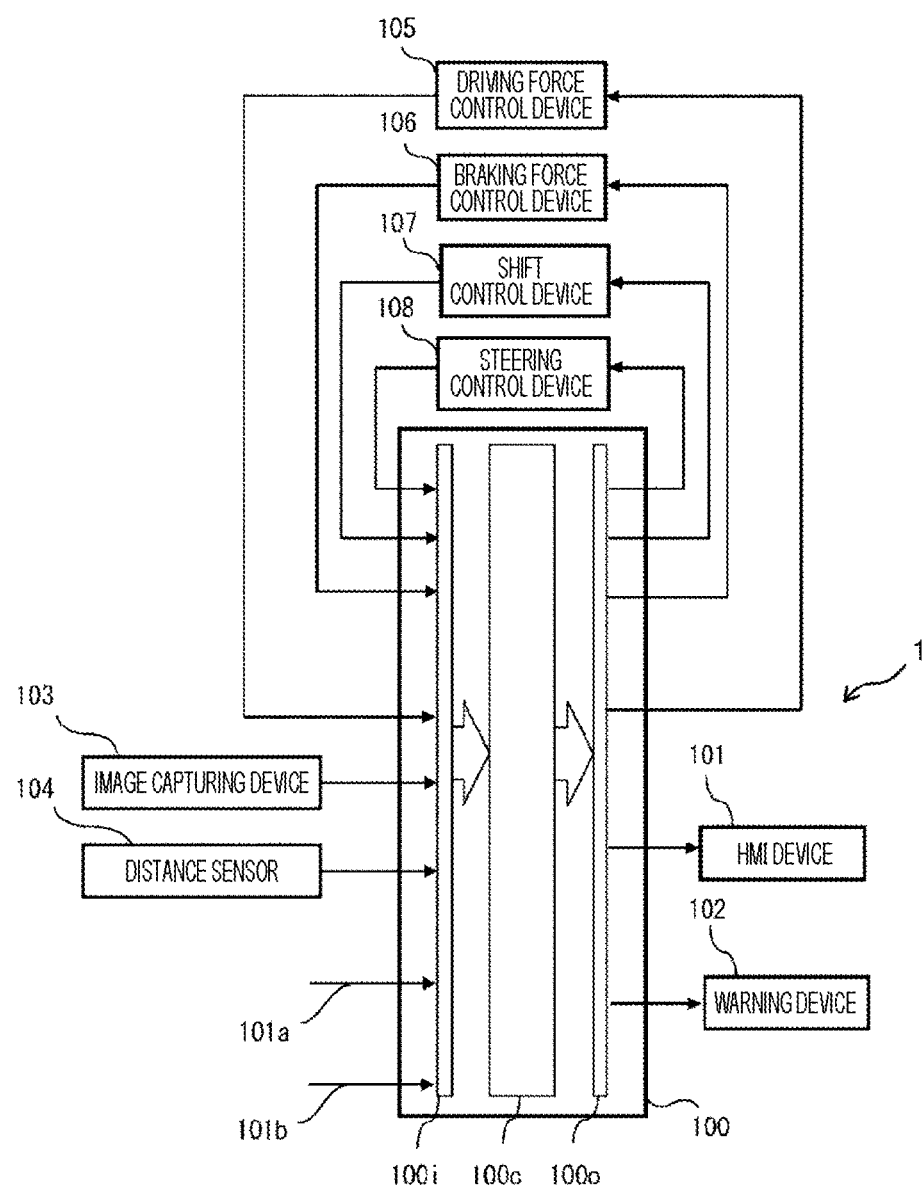
FIG. 2 is a diagram showing an input/output signal in the parking assistance apparatus.

FIG. 2 is a diagram showing an input/output signal in the parking assistance apparatus 1.

The parking assistance control device 100 includes an input unit 100i, a computer 100c, and an output unit 100o. As shown in FIG. 2, the information output from each of the image capturing device 103, the distance sensor 104, the driving force control device 105, the braking force control device 106, the shift control device 107, and the steering control device 108 is input to the input unit 100i of the parking assistance control device 100. Additionally, each of a signal 101a from a parking start switch for commanding start of parking and vehicle speed information 101b is input to the input unit 100i. The information that has been input to the parking assistance control device 100 is output to the driving force control device 105, the braking force control device 106, the shift control device 107, and the steering control device 108 via the computer 100c and the output unit 100o. The output unit 100o of the parking assistance control device 100 also outputs the information to the HMI device 101 and the warning device 102, so that a driver receives the information output as a display or an alarm sound.

The HMI device 101 and the warning device 102 form a reporting unit. The reporting unit reports the driver when the image capturing device 103 or the distance sensor 104 is detected as malfunctioning. For example, the HMI device 101 displays on a display screen that the image capturing device 103 or the distance sensor 104 malfunctions, or outputs a sound to report that the image capturing device 103 or the distance sensor 104 malfunctions. The warning device 102 outputs an alarm sound such as a beep to warn that the image capturing device 103 or the distance sensor 104 malfunctions.

The parking assistance apparatus 1 causes the external recognition devices, such as the image capturing device 103 and the distance sensor 104, to detect a parking position or the obstacle. Then, based on the information that has been input to the input unit 100i, the parking assistance apparatus 1 controls driving force, braking force, a shift (forward/reverse), and steering to automatically park along a parking path.

Figure 3:
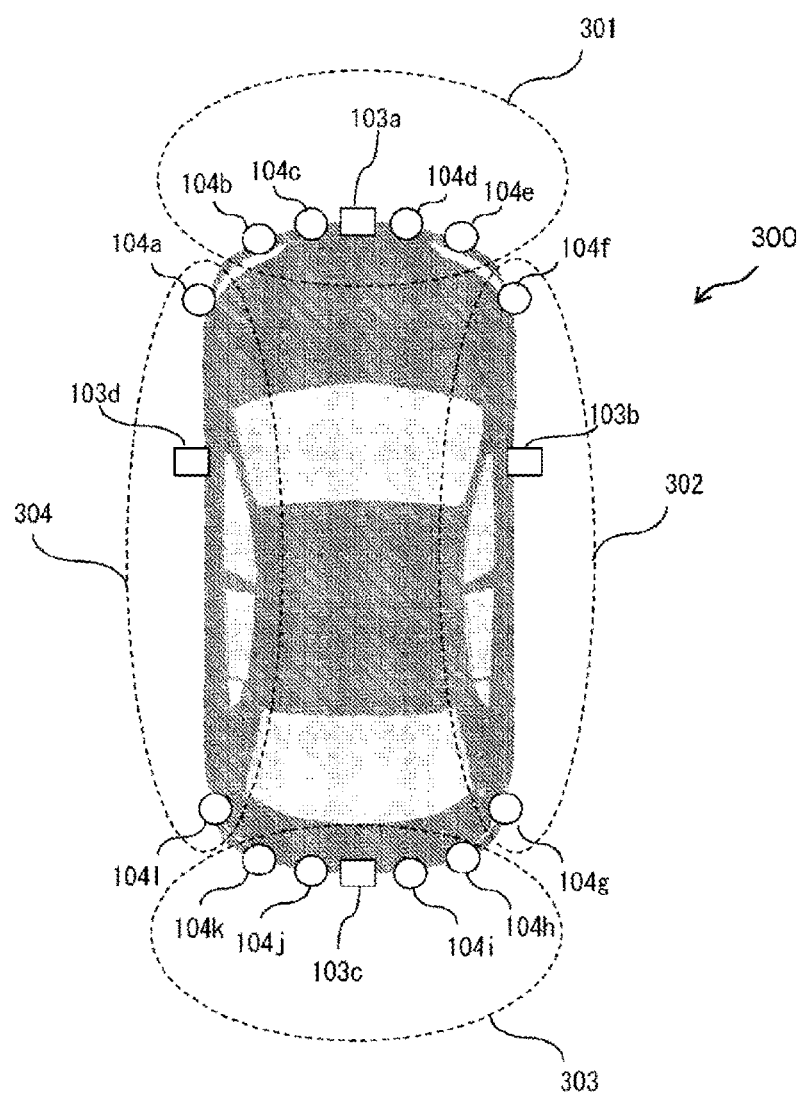
FIG. 3 is a diagram illustrating an arrangement of external recognition devices in a vehicle.

FIG. 3 is a diagram illustrating an arrangement of the external recognition devices in a vehicle 300. The vehicle 300 will be described below as an example of including cameras 103a, 103b, 103c, and 103d as the image capturing device 103, and sonars 104a, 104b, 104c, 104d, 104e, 104f, 104g, 104h, 104i, 104j, 104k, and 104l as the distance sensor 104.

As illustrated in FIG. 3, the sonars 104b to 104e and the camera 103a are provided to detect a frontward area 301 of the vehicle 300. The sonars 104h to 104k and the camera 103c are provided to detect a rearward area 303 of the vehicle 300. The sonar 104f, the sonar 104g, and the camera 103b are provided to detect a rightward area 302 of the vehicle 300. The sonar 104a, the sonar 104l, and the camera 103d are arranged to detect a leftward area 304 of the vehicle 300. These external recognition devices are divided into a frontward recognition group configured to detect the frontward area 301, a rearward recognition group configured to detect the rearward area 303, a rightward recognition group configured to detect the rightward area 302, and a leftward recognition group configured to detect the leftward area 304.

Figure 4:
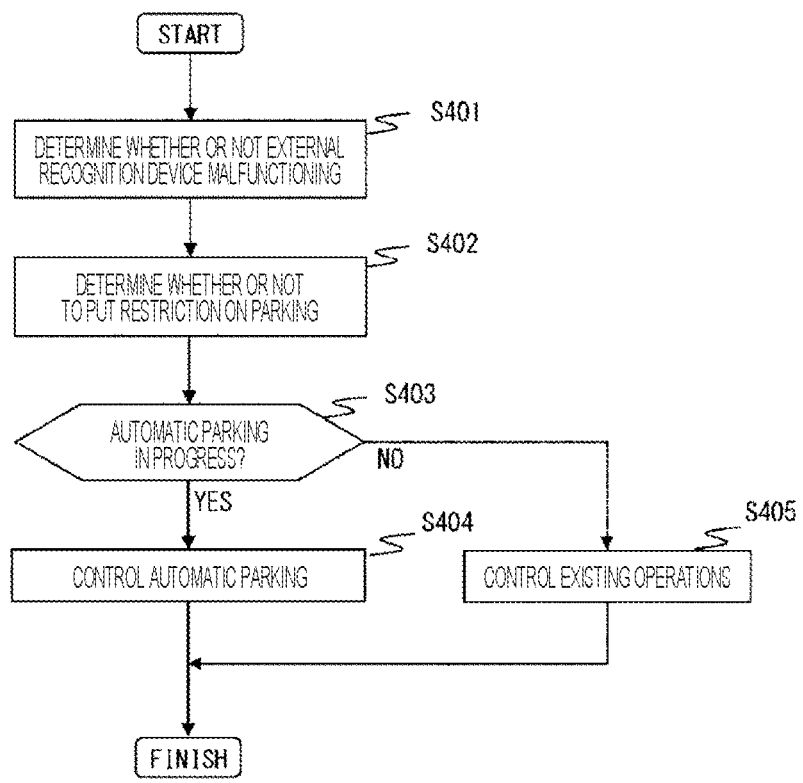
FIG. 4 is a flowchart showing a process sequence of the parking assistance apparatus.

FIG. 4 is a flowchart showing a process sequence of the parking assistance apparatus 1. Note that programs in this flowchart and in flowcharts to be described later may be executed by a computer including a CPU, a memory, or the like. The processing steps may be fully or partially executed by a hard logic circuit. Further, it is possible to provide these programs by previously storing the programs in a storage medium of the parking assistance apparatus 1. Alternatively, it is possible to provide the programs by storing in a separate storage medium, or it is possible to store the programs in the storage medium of the parking assistance apparatus 1 via a network line. The programs may be supplied as various forms of computer-readable computer program products such as data signal (carrier).

In processing S401 of FIG. 4, a determination is made whether or not any one of the external recognition devices, such as the cameras 103a to 103d and the sonars 104a to 104l, malfunctions. Processing S401 will be described in detail later with reference to FIG. 5. A malfunction of the cameras 103a to 103d includes, for example, an electrical failure, water drop attachment, lens clouding, lens contamination, insufficient illuminance, and poor visibility. A malfunction of the sonars 104a to 104l includes, for example, an electrical failure. A result of the malfunction determined in processing S401, which is in correspondence to each of the cameras 103a to 103d and each of the sonars 104a to 104l, is stored in a storage unit (not shown).

Next, in processing S402, based on the result of the malfunction of each of the external recognition devices in processing S401, the determination is made whether or not to restrict vehicle speed and whether or not to restrict a path, with reference to restriction information for parking control. A result of this determination is stored in the storage unit (not shown). The restriction information for parking control provides information for restriction of the vehicle speed specified in accordance with the determination results of malfunction of any one of the cameras 103a to 103d, and information for restriction of the path specified in accordance with the determination results of malfunction of any one of the sonars 104a to 104l. The restriction information for parking control is previously stored in the storage unit (not shown) and will be described in detail later with reference to FIG. 6.

Next, in processing S403, a determination is made whether or not the automatic parking is in progress. When the automatic parking is in progress, the process sequence proceeds to processing S404. When the automatic parking is not in progress, the process sequence proceeds to processing S405.

In processing S404, when any one of the external recognition devices is determined as malfunctioning during the automatic parking, automatic parking control is performed in accordance with the malfunction of the external recognition device. Processing S404 will be described in detail later with reference to FIG. 7. In processing S405, other existing operations than the automatic parking are controlled. The process sequence shown in FIG. 4 is repeatedly executed at a predetermined cycle.

Figure 5:
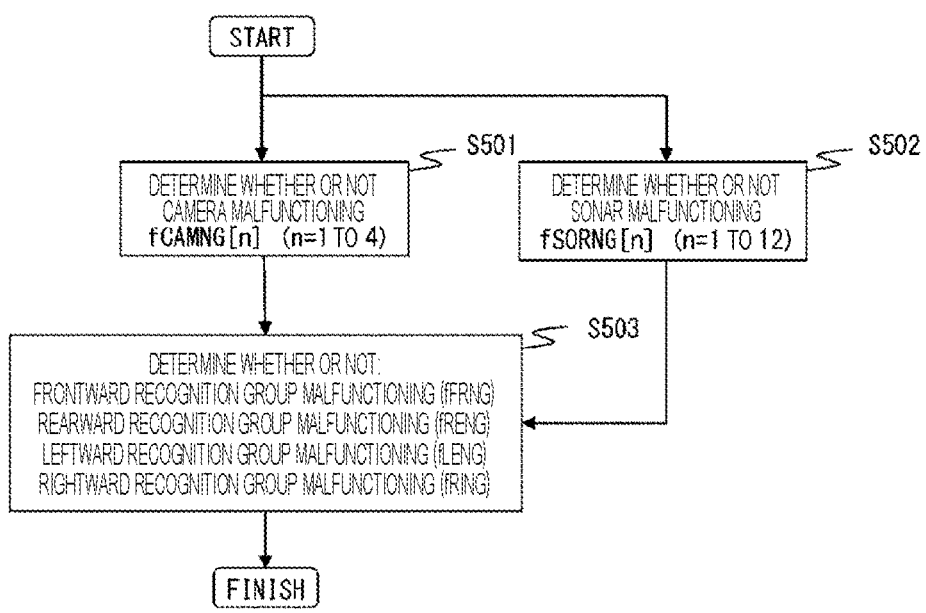
FIG. 5 is a flowchart showing a process sequence for determining whether or not any one of the external recognition devices malfunctions.

FIG. 5 is a flowchart showing a process sequence for determining whether or not any one of the external recognition devices malfunctions. FIG. 5 is a flowchart describing processing S401 of FIG. 4 in detail.

In FIG. 5, processing S501 and processing S502 are not dependent on each other and are thus concurrently executed. In processing S501, the determination is made whether or not any one of the cameras 103a to 103d malfunctions. The cameras 103a to 103d are respectively tested whether or not they function normally. Each of the cameras 103a to 103d results in a corresponding one of determinations fCAMNG

[1] to fCAMNG [4]. When each of the cameras 103*a* to 103*d* malfunctions, the corresponding one of the determinations fCAMNG [n] (n=1 to 4) is valued 1. When each of the cameras 103*a* to 103*d* does not malfunction, the corresponding one of the determinations fCAMNG [n] (n=1 to 4) is valued 0. The "n" represents the number of the cameras. In this embodiment, the cameras 103*a* to 103*d*, the number of which is four, correspond to n 1 to 4.

In processing S502, the determination is made whether or not any one of the sonars 104*a* to 104*l* malfunctions. The sonars 104*a* to 104*l* are respectively tested whether or not they function normally. Each of the sonars 104*a* to 104*l* results in a corresponding one of determinations fSORNG [1] to fSORNG [12]. When each of the sonars 104*a* to 104*l* malfunctions, the corresponding one of the determinations fSORNG [n] (n=1 to 12) is valued 1. When each of the sonars 104*a* to 104*l* does not malfunction, the corresponding one of the determinations fSORNG [n] (n=1 to 12) is valued 0. The "n" represents the number of the sonars. In this embodiment, the sonars 104*a* to 104*l*, the number of which is twelve, correspond to n 1 to 12.

In processing S503, based on a result of the determination in each of processing S01 and processing S02, a determination is made whether or not any one of the external recognition devices malfunctions. The external recognition devices are divided, in accordance with the arrangement of the cameras and the sonars, into the frontward recognition group, the rearward recognition group, the rightward recognition group, and the leftward recognition group. When the frontward recognition group malfunctions, a determination fFRNG is valued 1. When the rearward recognition group malfunctions, a determination fRENG is valued 1. When the leftward recognition group malfunctions, a determination fLENG is valued 1. When the rightward recognition group malfunctions, a determination fRING is valued 1. Here, when any one of the external recognition devices in each of the frontward recognition group, the rearward recognition group, the leftward recognition group, and the rightward recognition group malfunctions, the corresponding recognition group is determined as malfunctioning and is thus valued 1.

FIG. 6 is a table showing the restriction information for parking control and is used for the determination in processing S402 of FIG. 4. As shown in FIG. 6, a parking method includes forward and double parking, reverse and double parking, forward and parallel parking, reverse and parallel parking, forward and oblique parking, and reverse and oblique parking. Further, a parking direction includes a right direction and a left direction. The right direction indicates parking toward the right of the vehicle 300, and the left direction indicates parking toward the left of the vehicle 300. Depending on the combination of the parking method and the parking direction, parking is classified into twelve parking patterns as shown in FIG. 8 that will be described later.

When the determination fFRNG of the frontward recognition group, the determination fRENG of the rearward recognition group, the determination fLENG of the leftward recognition group, or the determination fRING of the rightward recognition group is valued 1 (malfunctioning), information to permit or prohibit the automatic parking is output in accordance with each of the parking patterns. For example, in the forward and double parking, as the parking method, toward the right, as the parking direction, the automatic parking is prohibited when the determination fFRNG of the frontward recognition group is valued 1 (malfunctioning); the automatic parking is permitted when the determination fRENG of the rearward recognition group is valued 1 (malfunctioning); the automatic parking is permitted when the determination fLENG of the leftward recognition group is valued 1 (malfunctioning); and the automatic parking is prohibited when the determination fRING of the rightward recognition group is valued 1 (malfunctioning). Further, in the forward and double parking, as the parking method, toward the right, as the parking direction, the information for restriction of the vehicle speed is output when any one of the determinations fCAMNG [1] to fCAMNG [4] corresponding to the cameras 103*a* to 103*d* is valued 1 (malfunctioning); and the information for restriction of the path is output when any one of the determinations fSORNG [1] to fSORNG [12] corresponding to the sonars 104*a* to 104*l* is valued 1 (malfunctioning).

In processing S404 previously described, the parking assistance control device 100 permits or prohibits the automatic parking with reference to the restriction information for parking control shown in FIG. 6. For example, the parking assistance control device 100 permits only rearward parking without turning when the recognition group provided at front of the vehicle malfunctions; the parking assistance control device 100 permits only frontward parking without turning when the recognition group provided at rear of the vehicle malfunctions; the parking assistance control device 100 permits only leftward parking when the recognition group provided at right of the vehicle malfunctions; and the parking assistance control device 100 permits only rightward parking when the recognition group provided at left of the vehicle malfunctions.

Figure 7:
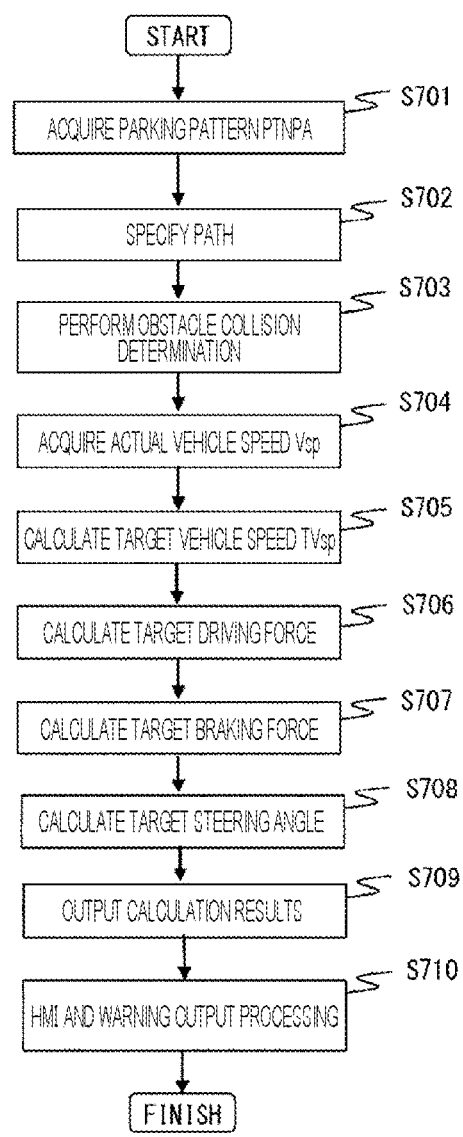
FIG. 7 is a flowchart showing a process sequence of the parking assistance apparatus for automatic parking.

FIG. 7 is a flowchart showing a process sequence of the parking assistance apparatus 1 for the automatic parking. FIG. 7 is a flowchart describing processing S404 of FIG. 4 in detail.

In processing S701, a parking pattern PTNPA is acquired in correspondence to the current parking method and parking direction of the vehicle. As shown in FIG. 8, the parking patterns PTNPA are specified as parking patterns 1 to 12 depending on the combination of the parking method and parking direction. The driver selects a desirable parking pattern from among the parking patterns displayed on the HMI device 101 out of the parking patterns 1 to 12, before proceeding to the automatic parking. Here, with reference to the restriction information for parking control in FIG. 6 in accordance with the malfunction determined in processing S401 of FIG. 4, when the selected parking pattern corresponds to any one of the parking patterns specified as "prohibited", the automatic parking is prohibited.

Figure 9:
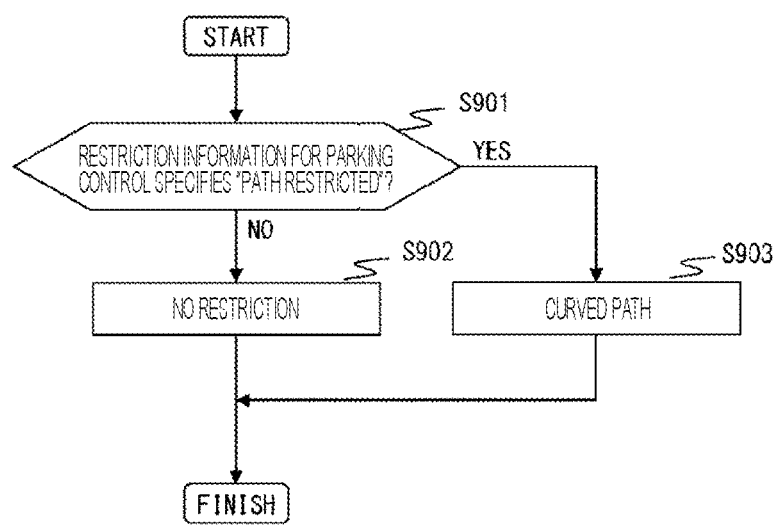
FIG. 9 is a flowchart showing a process sequence for specifying a path.

Next, in processing S702, the parking path is specified based on the parking pattern acquired in processing S701. FIG. 9 is a flowchart of route generation showing details of processing S702. In processing S901 of FIG. 9, the determination is made whether or not any one of the determinations fSORNG [1] to fSORNG [12] corresponding to the sonars 104*a* to 104*l* is valued 1 (malfunctioning) and whether or not the restriction information for parking control of FIG. 6 specifies "path restricted". When any one of the determinations fSORNG [1] to fSORNG [12] corresponding to the sonars 104*a* to 104*l* is not malfunctioning and thus the "path restricted" is not specified, processing is performed in processing S902 as no restriction required. On the other hand, when the "path restricted" is specified, the process proceeds to processing S903.

In processing S903 of FIG. 9, a path is newly specified in place of the parking path initially specified, such that the path includes a curved path having a small curvature. Even when the path newly specified increases the number of turns, the path is newly specified so as to include a curved path. With this configuration, when any one of the sonars 104a to 104l malfunctions, it is possible to improve accuracy in three-dimensional recognition of an object by the cameras 103a to 103d.

Returning to FIG. 7, in processing S703, an obstacle collision determination is made. In the obstacle collision determination, a determination is made whether or not the vehicle 300 approaches an obstacle on the parking path, and the vehicle 300 stops when a distance between the vehicle 300 and the obstacle is within a predetermined threshold. Here, when any one of the cameras 103a to 103d or any one of the sonars 104a to 104l malfunctions, the determination threshold for the distance between the vehicle 300 and the obstacle is made greater for safety reasons than when the cameras 103a to 103d and the sonars 104a to 104l function normally. When any of the cameras 103a to 103d or any one of the sonars 104a to 104l malfunctions and when the distance between the vehicle 300 and the obstacle is within the determination threshold, the automatic parking is desirably stopped. When the vehicle 300 does not approach any obstacle in processing S703, the process proceeds to processing S704.

In processing S704, an actual speed Vsp of the vehicle 300 is acquired based on the vehicle speed information 101b that has been input. Then, in processing S705, a target vehicle speed TVsp is calculated.

Processing S705 will be described in detail later with reference to FIGS. 10 to 13.

Next, in processing S706, a target driving force is calculated in accordance with the target vehicle speed TVsp. Subsequently, in processing S707, the target braking force is calculated in accordance with the target vehicle speed TVsp. In processing S708, a target steering angle along the parking path is calculated. Then, in processing S709, the calculation results are output to the driving force control device 105, the braking force control device 106, and the steering control device 108. As a result, the vehicle 300 moves at a predetermined speed along the path.

Next, in processing S710, the reporting unit formed of the HMI device 101 and the warning device 102 reports the result of the malfunction determined in processing S401 of FIG. 4 as well as the restriction of the vehicle speed or the restriction of the path determined in processing S402.

Figure 10:
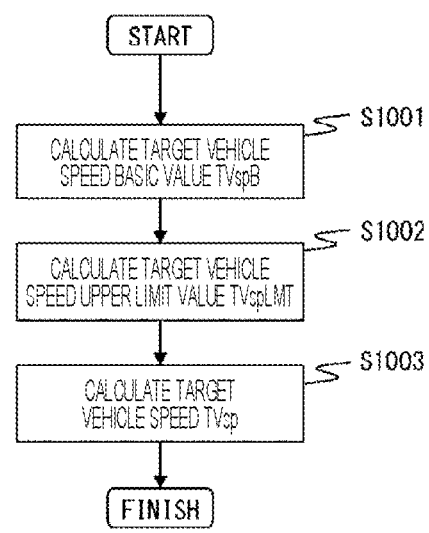
FIG. 10 is a flowchart showing a process sequence for calculating target vehicle speed.

FIG. 10 is a flowchart showing a process sequence for calculating the target vehicle speed and describes processing S705 of FIG. 7 in detail.

Figure 11:
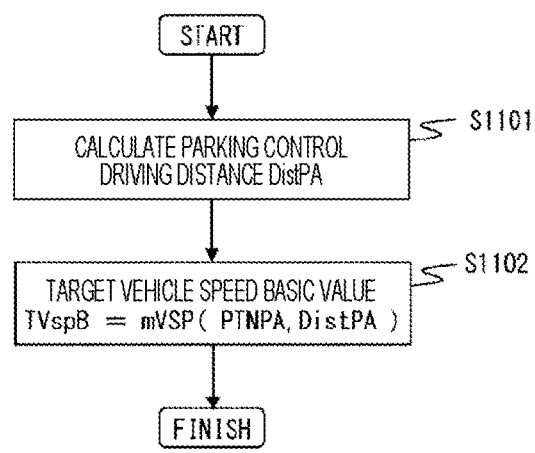
FIG. 11 is a flowchart showing a process sequence for calculating a basic value of the target vehicle speed.

In processing S1001 of FIG. 10, a target vehicle speed basic value TVspB is calculated. Details of the calculation of the target vehicle speed basic value TVspB are shown in FIG. 11. In processing S1101 of FIG. 11, a parking control driving distance DistPA from a parking start position to a parking end position is calculated.

Figure 12:
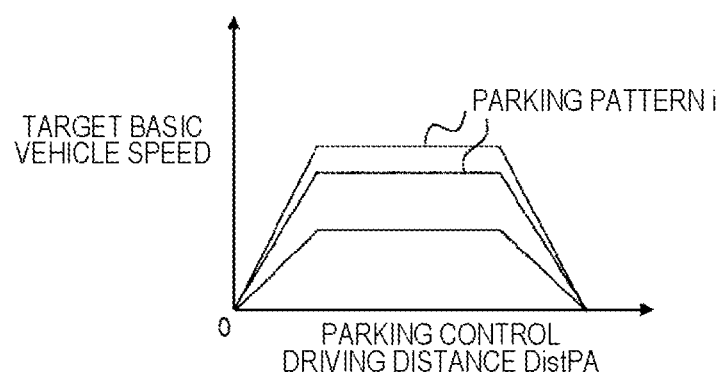
FIG. 12 is a map for calculating the basic value of the target vehicle speed.

In processing S1102 of FIG. 11, the basic value of the target vehicle speed is obtained based on a calculation map of FIG. 12. FIG. 12 is a diagram showing the calculation map for the basic value of the target vehicle speed. In the calculation map, a horizontal axis represents the parking control driving distance DistPA, and a vertical axis represents the target vehicle speed TVsp. As shown in FIG. 12, the target basic vehicle speed varies in accordance with the parking pattern i (i=1 to 12). The calculation map shown in FIG. 12 is previously stored in a storage unit (not shown).

Returning to FIG. 10, in processing S1002, a target vehicle speed upper limit TVspLMT is calculated.

Figure 13:
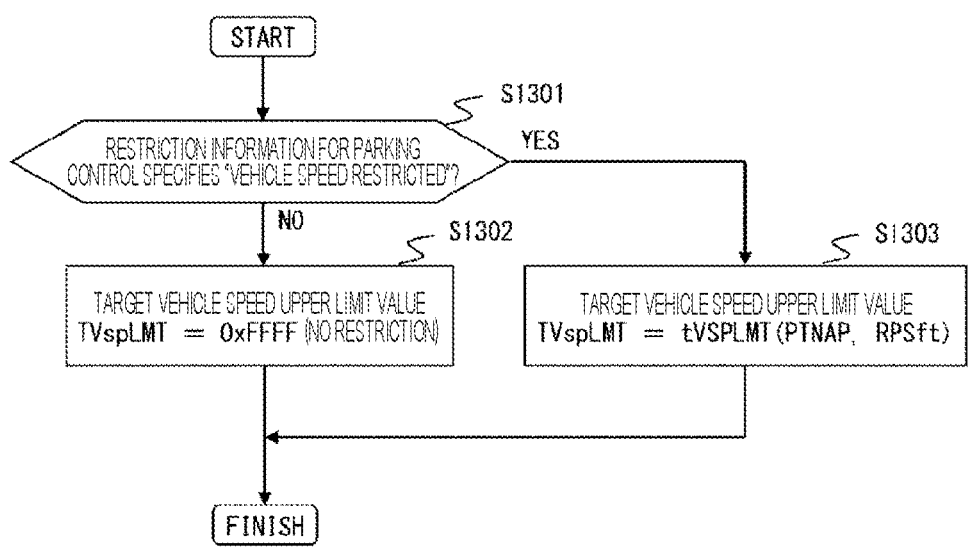
FIG. 13 is a flowchart showing a process sequence for calculating an upper limit value of the target vehicle speed.

Details of the calculation of the target vehicle speed upper limit value TVspLMT are shown in FIG. 13. In processing S1301 of FIG. 13, the determination is made whether or not any one of the determinations fCAMNG [1] to fCAMNG [4] corresponding to the cameras 103a to 103d is valued 1 (malfunctioning) and whether or not the restriction information for parking control of FIG. 6 specifies "vehicle speed restricted". When the determinations fCAMNG [1] to fCAMNG [4] corresponding to the cameras 103a to 103d are not malfunctioning and thus the "vehicle speed restricted" is not specified, the process proceeds to processing S1302 to specify no restriction on the target vehicle speed upper limit value TVspLMT. On the other hand, when the "vehicle speed restricted" is specified, the process proceeds to processing S1303 to specify the target vehicle speed upper limit value. The target vehicle speed upper limit value is specified in advance for each of the parking patterns PTNAP and each of shift information RPSft (forward/reverse), and is stored in the storage unit (not shown).

Returning to FIG. 10, in processing S1003, the target vehicle speed TVsp that does not exceed the target vehicle speed upper limit value is calculated. The target vehicle speed TVsp is specified to be an optimal speed in accordance with the parking pattern and the "vehicle speed restricted" as a result of the malfunction of any one of the cameras 103a to 103d.

Figure 14:
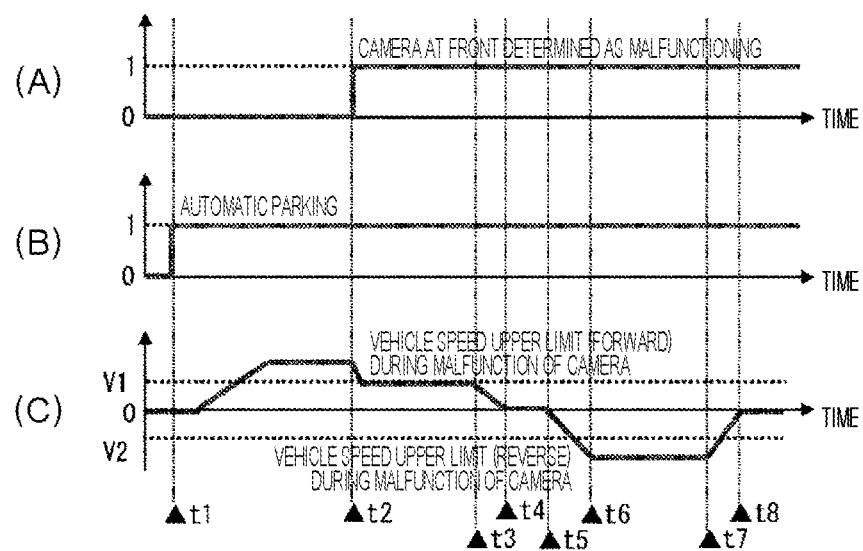
FIG. 14 is a time chart for parking when a camera malfunctions.

FIG. 14 is a time chart showing the reverse and double parking when one of the cameras malfunctions. FIG. 14 (A) shows a timing at which the camera provided at the front is determined as malfunctioning, FIG. 14 (B) shows a timing of the automatic parking, and FIG. 14 (C) shows a change in the vehicle speed. In each of FIGS. 14 (A), (B), and (C), a horizontal axis represents time.

As shown in FIG. 14 (B), the automatic parking starts at time t1. Thus, the vehicle speed starts increasing as shown in FIG. 14 (C). As shown in FIG. 14 (A), the camera provided at the front is presumably detected as malfunctioning at time t2. Then, as shown in FIG. 14 (C), the vehicle speed decreases to a vehicle speed upper limit V1 in response to the malfunction of the camera. At time t4, the vehicle reaches a turning position and stops. The shift switches from forward to reverse, and the vehicle speed increases in a reverse direction at time t5. In this state, the camera provided at the rear does not malfunction, and the vehicle thus drives in a speed exceeding a vehicle speed upper limit V2 for reverse driving. The vehicle speed starts decreasing at time t7 when approaching a target parking position, and the vehicle stops at time t8.

With this configuration, in response to the malfunction of the camera, it is possible to continue the automatic parking using the sonars by restricting the vehicle speed.

Figure 15:
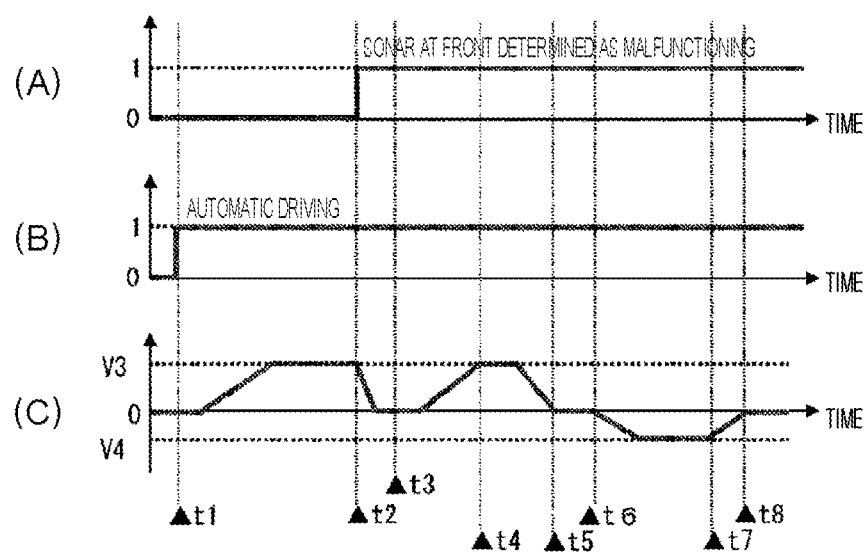
FIG. 15 is a time chart for parking when a sonar malfunctions.

FIG. 15 is a time chart showing the reverse and double parking when one of the sonars malfunctions. FIG. 15 (A) shows a timing at which any one of the sonars provided at the front is determined as malfunctioning, FIG. 15 (B) shows a timing of the automatic parking, and FIG. 15 (C) shows a change in the vehicle speed. In each of FIGS. 14 (A), (B), and (C), a horizontal axis represents time.

As shown in FIG. 15 (B), the automatic parking starts at the time t1. Thus, the vehicle speed increases to a vehicle speed V3 as shown in FIG. 15 (C). As shown in FIG. 15 (A), one of the sonars provided at the front is presumably detected as malfunctioning at time t2. Then, as shown in FIG. 15 (C), the vehicle speed decreases and the vehicle stops. At time t3, a path is specified in response to the malfunction of the sonar.

FIG. 16 illustrates the parking path when one of the sonars malfunctions. FIG. 16 (A) illustrates a parking path from time t1 to time t3, and FIG. 16 (B) is a parking path from time t3 to time t8. In FIG. 16 (A), for the vehicle 300, a parking path 500 is specified to target a parking position 400 as the target parking position. In FIG. 16 (B), the vehicle 300 has proceeded to a position at time 3, and a parking path 600 is newly specified for the vehicle 300 to target the parking position 400. In other words, the path is specified in response to the malfunction of any one of the sonars at time t3. As illustrated in FIG. 16 (B), the parking path 600 has been changed to be a curved path. Then, as shown in FIG. 15 (C), the vehicle speed is increased again to the vehicle speed V3, and the vehicle moves forward toward the turning position. At time t5, the vehicle reaches the turning position and stops. Subsequently, the shift switches from forward to reverse, and the vehicle speed increases in the reverse direction to a vehicle speed V4 at time t6. The vehicle speed starts decreasing at time t7 when the vehicle approaches the target parking position 400, and the vehicle stops at time t8.

With this configuration, in response to the malfunction of a sonar, it is possible to continue the automatic parking using a camera by changing the parking path to a curved path.

Note that in this embodiment, each of the image capturing device 103 and the distance sensor 104 is described as an example of the external recognition devices. Alternatively, external recognition devices having other detection characteristics may be applied to a parking assistance apparatus that employs a plurality of external recognition devices having different detection characteristics.

According to the embodiment described above, the following operational effects can be obtained.

(1) The parking assistance apparatus 1 includes: the plurality of external recognition devices (the image capturing device 103 and the distance sensor 104) provided in the vehicle 300; and the parking assistance control device 100 configured to control the automatic parking based on the external recognition devices (the image capturing device 103 and the distance sensor 104). When one of the plurality of external recognition devices (the image capturing device 103 or the distance sensor 104) malfunctions, the parking assistance control device 100 changes to perform control in accordance with the other external recognition device (the image capturing device 103 or the distance sensor 104) that does not malfunction.

With this configuration, even when one of the external recognition devices (the image capturing device 103 or the distance sensor 104) malfunctions, it is possible to continue the automatic parking by using the other external recognition device (the image capturing device 103 or the distance sensor 104).

The present invention is not limited to the above-described embodiment, and other forms conceivable within the scope of the technical idea of the present invention are also included in the scope of the present invention as long as the characteristics of the present invention are not impaired.

REFERENCE SIGNS LIST 1 parking assistance apparatus
100 parking assistance control device
101 HMI device
102 warning device
103 image capturing device
103a to 103d camera
104 distance sensor
104a to 104l sonar
105 driving force control device
106 braking force control device
107 shift control device
108 steering control device

The invention claimed is:

1. A parking assistance apparatus comprising:
a plurality of external recognition devices provided in a vehicle; and
a processor configured to control automatic parking based on the plurality of external recognition devices,
wherein when one of the plurality of external recognition devices has a malfunction, the processor changes to perform control in accordance with other external recognition devices of the plurality of external recognition devices that do not have a malfunction,
wherein one of the plurality of external recognition devices corresponds to an image capturing device or a distance sensor device, and
wherein the processor changes a parking path of the vehicle to a curved path when the distance sensor device has the malfunction.

2. The parking assistance apparatus according to claim 1, wherein the processor decreases a vehicle speed of the vehicle when the image capturing device has the malfunction.

3. The parking assistance apparatus according to claim 1, wherein the distance sensor device corresponds to any one of a sonar, a millimeter wave radar, and a laser radar.

4. The parking assistance apparatus according to claim 1, wherein
the processor divides the plurality of external recognition devices into groups in accordance with a position of each of the plurality of external recognition devices provided in the vehicle, the groups regarded as recognition groups, and
the processor determines whether or not each of the recognition groups has the malfunction.

5. The parking assistance apparatus according to claim 4, wherein
the processor divides the plurality of external recognition devices into the recognition groups in accordance with front, rear, right, and left of the vehicle, and
the processor determines whether or not each of the recognition groups has the malfunction.

6. The parking assistance apparatus according to claim 5, wherein in response to the recognition group having the malfunction, the processor prohibits or permits a parking pattern in accordance with a parking method.

7. The parking assistance apparatus according to claim 6, wherein the processor permits rearward parking without turning when the recognition group provided at the front of the vehicle has the malfunction.

8. The parking assistance apparatus according to claim 6, wherein the processor permits frontward parking without turning when the recognition group provided at the rear of the vehicle has the malfunction.

9. The parking assistance apparatus according to claim 6, wherein the processor permits leftward parking when the recognition group provided at the right of the vehicle has the malfunction.

10. The parking assistance apparatus according to claim 6, wherein the processor permits rightward parking when the recognition group provided at the left of the vehicle has the malfunction.

11. The parking assistance apparatus according to claim 1, wherein
when the malfunction occurs, the processor increases a determination threshold to be larger than when the malfunction does not occur, the determination threshold used to determine a distance between the vehicle and an obstacle on a parking path, and when the distance is equal to or below the determination threshold, the processor stops the automatic parking.

12. The parking assistance apparatus according to claim 1, further comprising at least one of a display and an alarm configured to report the malfunction, wherein the processor detects whether or not any one of the plurality of external recognition devices has the malfunction, and when the malfunction is detected, the at least one of the display and the alarm reports the malfunction.

13. The parking assistance apparatus according to claim 12, wherein the at least one of the display and the alarm reports the malfunction on a screen to a driver.

14. The parking assistance apparatus according to claim 12, wherein the at least one of the display and the alarm reports the malfunction as an alarm sound to a driver.

* * * * *